United States Patent [19]
Boyle

[11] 3,722,371
[45] Mar. 27, 1973

[54] HIGH RATIO LINKAGE MECHANISM
[75] Inventor: Robert F. Boyle, Kalamazoo, Mich.
[73] Assignee: Pneumo Dynamics Corporation, Cleveland, Ohio
[22] Filed: Mar. 12, 1970
[21] Appl. No.: 19,038

[52] U.S. Cl. ..............................92/5 R, 92/31, 91/3, 91/374, 74/89, 74/99
[51] Int. Cl. .......F01b 25/26, F01b 31/12, F15b 9/10
[58] Field of Search............91/368, 3, 374, 1, 31, 32, 91/33, 382; 92/5 R; 74/101, 89, 99

[56] References Cited

UNITED STATES PATENTS

| 3,200,586 | 8/1965 | Ernest | 92/5 R |
| 3,218,937 | 11/1965 | Dettlof | 91/368 |
| 3,424,183 | 1/1969 | Coakley | 91/3 |
| 3,460,436 | 8/1969 | Takeda | 91/3 |
| 3,168,011 | 2/1965 | Baumann | 92/5 R |
| 3,403,365 | 9/1968 | Richards | 92/5 R |

FOREIGN PATENTS OR APPLICATIONS

| 347,664 | 4/1931 | Great Britain | 91/382 |

Primary Examiner—Paul E. Maslousky
Attorney—Stephen M. Mihaly

[57] ABSTRACT

Linkage mechanism comprises a close coupling between two or more elements in the form of a drive member having one end fixed to one of the elements and the other end acting in an angled slot in the other element to obtain a high ratio of travel between elements. A position-indicating device attached directly to one of the elements accurately senses the position of both elements.

9 Claims, 3 Drawing Figures

PATENTED MAR 27 1973 3,722,371
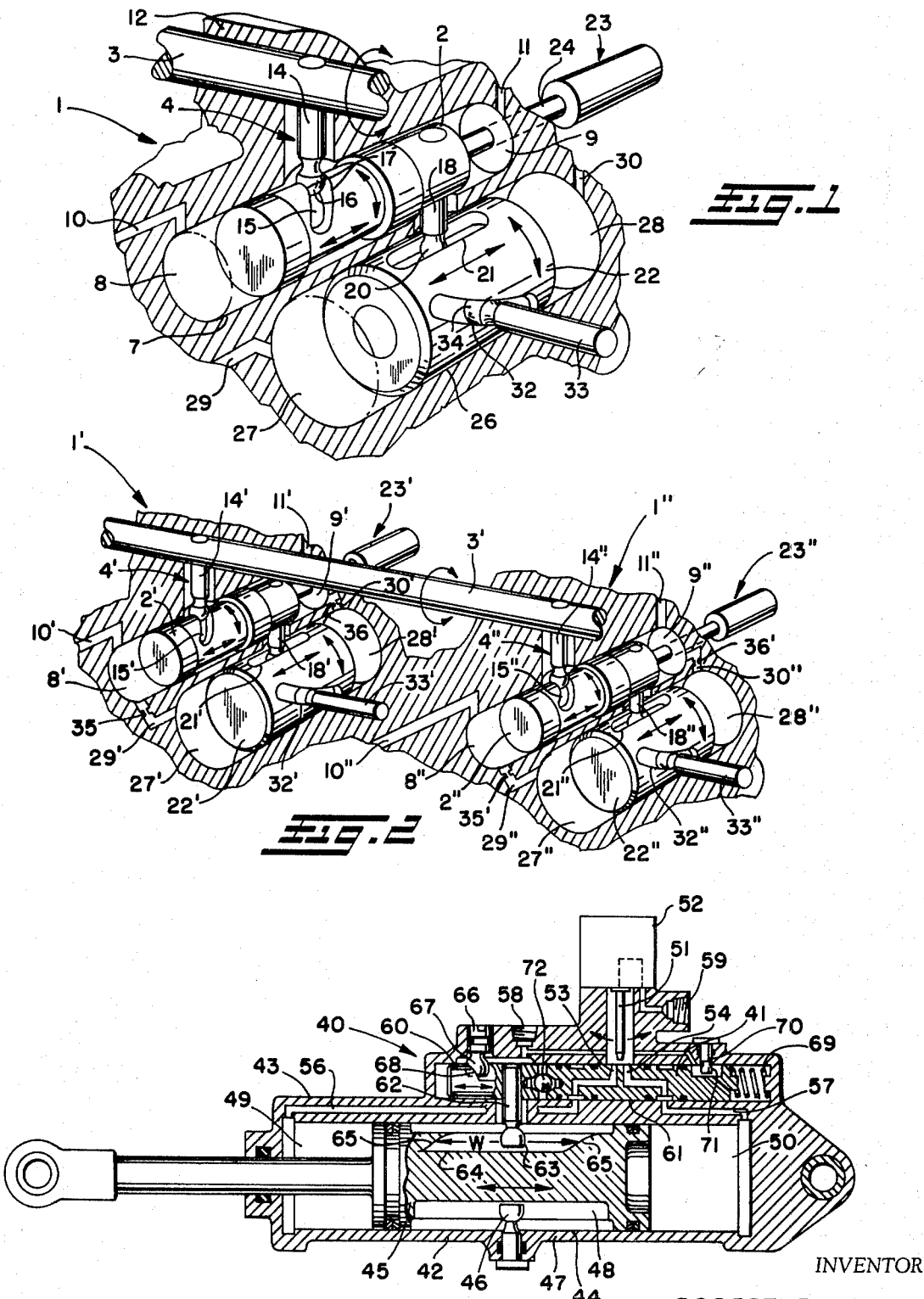
Fig.1
Fig.2
Fig.3
INVENTOR
ROBERT F. BOYLE
ATTORNEY

HIGH RATIO LINKAGE MECHANISM

The present invention relates generally as indicated to a high ratio linkage mechanism, particularly for use in accurately controlling movements of various fluid control systems, including servomechanisms, electrohydraulic valves and staged valves.

Heretofore, controlled movements of fluid control mechanisms have commonly been accomplished using the well-known walking beam principle, but such an arrangement is not as accurate as may be necessary for a given application, particularly in space and flight control systems, because of the number of joints that are required to interconnect the various components. Looseness in any one of the joints will substantially effect accuracy of the device.

With the linkage mechanism of the present invention, however, extremely accurate adjustments may be made because of the manner in which the elements are coupled together. Basically, the linkage mechanism consists of a close coupling between elements which provides a combination of rolling and axial motion translated by drive members acting in angled and helical slots to obtain a high ratio of travel between the elements. A position-indicating device is attached directly to one of the elements for movement therewith, and only one joint is required between adjacent elements, whereby the chance of element-position error is greatly reduced.

With the foregoing in mind, it is a principal object of this invention to provide a linkage mechanism of the type described which is of relatively simple construction and provides a close coupling linkage having a high ratio of travel between two or more elements.

Another object is to provide such a linkage mechanism with a position-indicating device attached directly to one of the elements and a drive member providing a single joint between two such elements for greatly increasing the accuracy of the position-indicating device in sensing the position of the elements.

Yet another object is to provide such a linkage mechanism for use as a high ratio position equalizing linkage between identical fluid control systems.

A further object is to provide such a linkage mechanism for use as a high ratio position feedback between two or more elements.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 1 is a fragmentary isometric view, partially in section, of a preferred form of high ratio linkage mechanism constructed in accordance with the present invention;

FIG. 2 is an isometric view partially in section showing two such linkage mechanisms interconnected together to provide a high ratio position linkage between identical fluid control systems; and FIG. 3 is a fragmentary longitudinal section through a fluid actuator including a high ratio linkage mechanism in accordance with this invention for providing position feedback.

Referring now in detail to the drawing and first especially to FIG. 1, a preferred form of high ratio linkage mechanism in accordance with this invention is generally indicated by the reference numeral 1 and comprises two main elements 2 and 3 coupled together by a drive member 4, in a manner to be subsequently described. One of the elements 2 may be a drive piston slidably received in a bore or cylinder 7. Differential fluid pressure supplied to the pressure chambers 8 and 9 at opposite ends of the drive piston 2 through ports 10 and 11, respectively, causes movement of the drive piston 2 axially within the cylinder.

The other element 3 may be an output shaft journalled in the housing 12 for rotation by the drive piston 2 during axial movement thereof through the drive member 4 which consists of an arm 14 having one end fixed with respect to the output shaft 3 and the other end received in an angled slot 15 in the outer periphery of the drive piston 2. A ball 16 may be provided on the end of the arm 14 which is received in the slot 15 to minimize drag between such arm and the walls 17 of the slot.

The drive piston 2 may be restrained against rotation by another arm 18 projecting radially outwardly from the drive piston and having a ball 20 on its outer end which is received in an axially extending groove or slot 21 in an adjacent element 22. For sensing the position of the drive piston 2 and thus the output shaft 3 driven thereby, there is provided a position-indicating device 23 which may be an electrical sensor such as a linear variable differential transducer including a movable core member 24 rigidly connected to the piston 2. Since there are no joints between the position-indicating device 23 and drive piston 2 and only one joint between the drive piston 2 and output shaft 3, movements of the drive piston 2 and output shaft 3 may be very accurately controlled.

The axially extending groove 21 which is used to restrain the drive piston 2 against turning may, if desired, be formed directly in the wall of the cylinder 7. However, where repositioning of the position-indicating device 23 relative to the output shaft 3 is desired, the groove 21 is provided in the outer surface of an auxiliary piston 22 contained in an auxiliary cylinder or bore 26 paralleling the cylinder 7. Axial movement of the auxiliary piston 22 in its bore may be obtained by establishing a differential pressure in the pressure chambers 27 and 28 at opposite ends of the auxiliary cylinder 26. Pressure is supplied to the respective chambers 27 and 28 through ports 29 and 30 communicating therewith.

The auxiliary piston 22 has a helical slot 32 in the outer surface thereof which reacts against a fixed pin 33 during such axial movement of the auxiliary piston to cause simultaneous rotation thereof. A ball 34 may be provided on the inner end of the pin 33 for receipt in the helical slot 32.

As will be apparent, when the output shaft 3 is restrained from turning and differential pressure is applied to the pressure chambers 27 and 28 at the ends of the auxiliary piston 22 and/or to such pressure chambers 27 and 28 and the pressure chambers 8 and 9 at opposite ends of the drive piston 2, the auxiliary piston 22 moves axially and also rotates thus to cause rotation of the drive piston 2 through the ball arm 18 connection therebetween. During rotation of the drive piston 2 the angled slot 15 therein reacts on the ball arm 14 and forces the drive piston 2 in an axial direction to move the position-indicating device 23 connected thereto to a new position relative to the output shaft 3 position.

In FIG. 2, two such high ratio linkage mechanisms 1' and 1" are shown, each substantially identical to the linkage mechanism 1 of FIG. 1 except that they have a common output shaft 3' connecting the mechanisms together to provide a high ratio position equalizing linkage therebetween. The ports 29', 30' and 29", 30" at opposite ends of the auxiliary pistons 22', 22" may be connected to the pressure chambers 8', 9' and 8", 9" at opposite ends of the drive pistons 2', 2" through orifices 35, 36 and 35', 36' in such ports thus to cause a delay in the movement of the auxiliary pistons for rotating the drive pistons 2', 2" in a direction opposing rotation of the output shaft 3' by axial movement of the drive pistons 2', 2". Otherwise, the details of construction and operation of the linkage mechanisms 1' and 1" of FIG. 2 are substantially the same as the linkage mechanism 1 of FIG. 1 previously described, and the same reference numerals followed by prime symbols are used to designate like parts. Of course, fixing of the output shaft 3' will permit resetting of the position of the position-indicating devices 23', 23" through axial and rotational movements of the auxiliary and drive pistons as previously described.

In FIG. 3, there is shown a high ratio linkage mechanism 40 constructed in accordance with this invention for use in providing a high ratio position feedback from a fluid actuator 42 to a single stage valve 41. The fluid actuator 42 consists of a housing 43 containing a bore or cylinder 44 in which is axially slidably received an actuator piston 45. A pin 46 extending from the cylinder wall 47 into a longitudinal groove 48 in the piston 45 prevents turning of the piston during such axial movement.

Differential pressure is established in the chambers 49 and 50 at opposite ends of the piston 45 through lateral movement of a jet pipe 51 by actuation of a torque motor 52 in known manner to bring the jet pipe into more direct alignment with one or the other of the receivers 53 and 54 in the valve 41, which creates a higher fluid pressure in one of the receivers than in the other. Such receivers 53 and 54 in turn communicate with the chambers 49 and 50 at opposite ends of the piston 45 through passages 56 and 57 in the cylinder housing 43. The return fluid escapes through a discharge port 58 in the housing for return to a reservoir (not shown) and recirculation back through the inlet port 59 which supplies the required high pressure fluid to the jet pipe 51.

Feedback from the piston 45 to the valve 41 is obtained through the high ratio linkage mechanism 40, which includes a piston 60 contained in the same bore 61 as the valve 41 for movement in a direction parallel to the movement of the actuator piston 45. Fixed to the piston 60 is a drive member arm 62 which extends radially outwardly therefrom and has a ball 63 on its outer end for receipt in a helical slot 64 in the actuator piston 45.

The slot 64 has a width w substantially greater than the diameter of the ball 63 to prevent contact between the ball 63 and walls 65 of the slot 64 during a portion of the stroke of the actuator piston 45. When such contact does occur, the arm 62 and piston 60 are caused to rotate, and such rotation is translated into axial movement of the piston 60 in the same direction as the actuator piston 45 by a pin 66 fixed with respect to the housing 43 and having a ball 67 extending into an angled slot 68 in the piston 60.

The valve 41 is urged toward the piston 60 by a spring 69 so that the valve 41 moves axially with the piston 60, but the valve 41 is restrained against rotation by a pin 70 fixed with respect to the housing 43 and extending into an axial slot 71 in the valve 41. A ball 72 interposed between adjacent ends of the piston 60 and valve 41 permits relative rotation of the piston 60 with respect to the valve 41 during such axial movement. The axis of the ball 67 is desirably slightly offset with respect to the axis of the pin 66 to permit limited adjustment of the valve 41 through rotation of the pin 66.

When the feedback from piston 45 to piston 60 is sufficient to reposition the valve 41 so that the receivers 53 and 54 are equally spaced with respect to the jet pipe 51, the fluid pressure in the chambers 49 and 50 at opposite ends of the main piston 45 will become balanced thus to lock the piston 45 against further movement until the jet pipe 51 is once again moved with respect to the receivers to provide a differential pressure in the chambers. If desired, the actuator may be replaced by the second stage of a two-stage electrohydraulic valve to provide high ratio position feedback between stages.

From the foregoing, it can now be seen that the high ratio linkage mechanism of the present invention provides a close coupling between two or more elements having a high ratio of travel therebetween which is obtained through a combination of rolling and axial motion translated by drive members acting in angled and helical slots. With such a construction, only one joint is required between elements, and the position-indicating device may be connected directly to one of the elements thus to greatly improve the accuracy of the position-indicating device in sensing the position of the elements.

I therefore particularly point out and distinctly claim as my invention:

1. A linkage mechanism comprising a first element mounted for axial movement in response to differential fluid pressure applied thereto, means for rotating said first element during such axial movement thereof, a second element mounted for axial movement in a direction parallel to the movement of said first element, and feedback means between said first and second elements for rotating said second element during rotational movement of said first element, and means for moving said second element axially in response to rotational movement thereof.

2. The linkage mechanism of claim 1 further comprising a third element mounted for rotational movement, drive means interconnecting said second and third elements for rotation of said third element by axial movement of said second element, and position-indicating means directly connected to one of said elements for sensing the position of said elements.

3. A linkage mechanism comprising first and second elements, said first element being mounted for axial movement by fluid pressure actuation and said second element being mounted for rotational movement, drive means interconnecting said first and second elements for rotation, of said second element by axial movement of said first element, position-indicating means directly connected to said first element for sensing the position of said elements, and restraining means for restraining said first element against rotation, said restraining means comprising a third element mounted for axial movement by fluid pressure actuation, an axial slot in said third element, a pin fixed with respect to said first element and extending into said axial slot in said third element, and means for effecting rotation of said third element during axial movement thereof to cause a corresponding rotation of said first element.

4. The linkage mechanism of claim 3 wherein said means for rotating said third element comprises an angled slot in said third element, and a fixed pin extending into said last-mentioned angled slot.

5. The linkage mechanism of claim 3 further comprising means for restraining said second element against movement to permit resetting of the position of said position-indicating means with respect to said second element through axial and rotational movement of said first element by said third element.

6. The linkage mechanism of claim 3 wherein said first and third elements are mounted for axial movement in parallel bores upon application of differential fluid pressure to opposite ends of the respective bores, ports communicate with the ends of the bore containing said first element for supplying fluid pressure thereto, and additional ports containing orifices communicate the ends of the bore containing said third element with the respective ends of the bore containing said first element, whereby fluid pressure supplied to the ends of the bore containing said first element is also supplied to the ends of the bore containing said third element to move said third element for rotating said first element in a direction opposing rotation of said second element by axial movement of said first element.

7. A linkage mechanism comprising first and second elements, said first element being mounted for axial movement by fluid pressure actuation and said second element being mounted for rotational movement, drive means interconnecting said first and second elements for rotation of said second element by axial movement of said first element, and position-indicating means directly connected to said first element for sensing the position of said elements, said drive means comprising a drive arm fixed with respect to said second element and having a ball on the outer end thereof which is received in an angled slot in said first element, there being two of said linkage mechanisms, said second element being common to both of said linkage mechanisms to provide a high ratio position equalizing linkage therebetween.

8. The linkage mechanism of claim 7 further comprising restraining means for restraining said first element against rotation.

9. The linkage mechanism of claim 7 wherein said position-indicating means comprises a linear variable differential transducer including an axially movable core member connected to one end of said first element for axial movement therewith.

* * * * *